Oct. 8, 1968    S. C. BELL    3,405,158
N-SULFONOXYACETYL-ANTHRANILIC ACIDS
Original Filed June 26, 1964
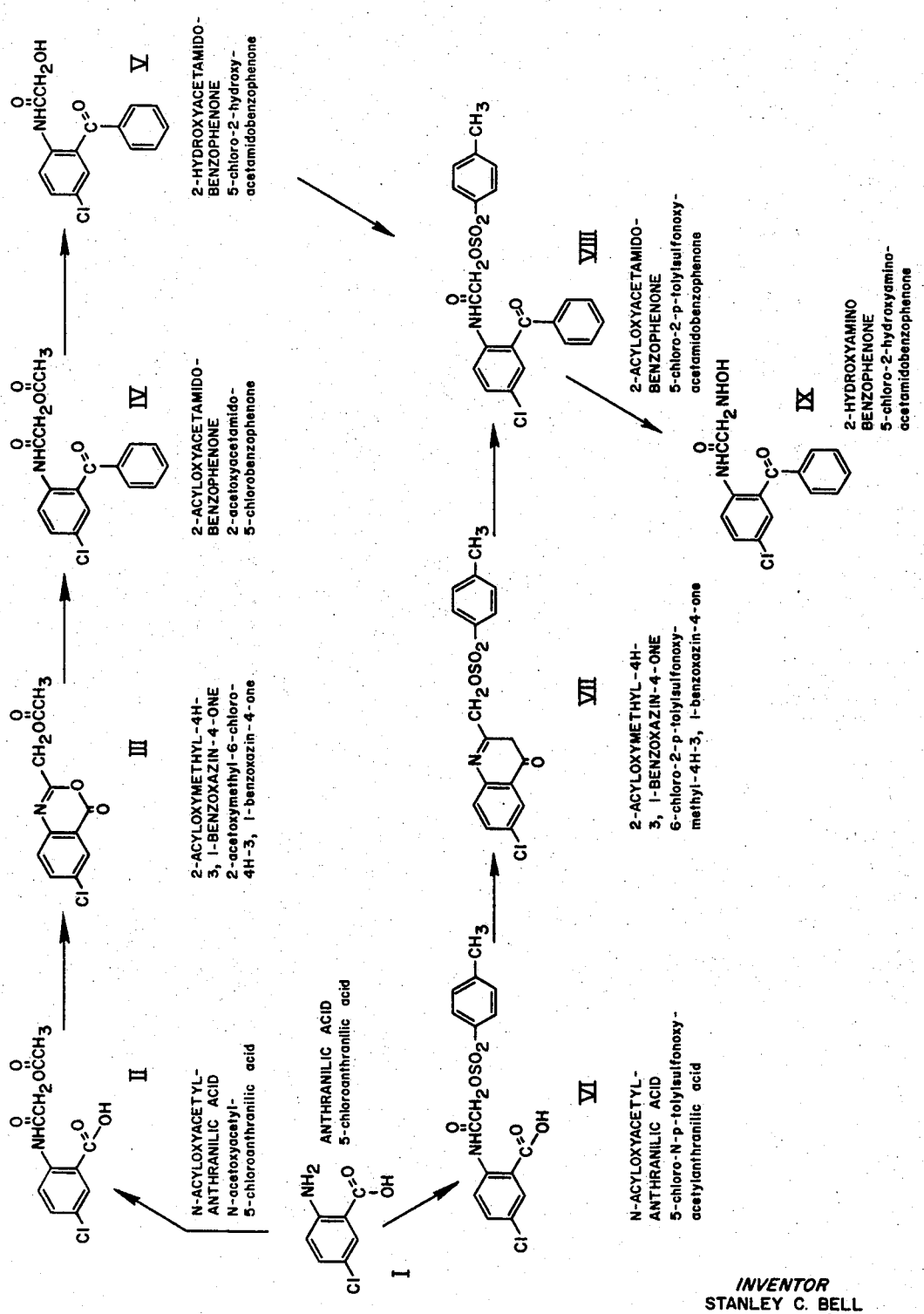
INVENTOR
STANLEY C. BELL
BY Vito Victor Bellino
ATTORNEY

United States Patent Office 3,405,158
Patented Oct. 8, 1968

3,405,158
N-SULFONOXYACETYL-ANTHRANILIC ACIDS
Stanley Charles Bell, Penn Valley, Pa., assignor to American Home Products Corporation, New York, N.Y., a corporation of Delaware
Original application June 26, 1964, Ser. No. 378,345, now Patent No. 3,328,397, dated June 27, 1967. Divided and this application Sept. 22, 1966, Ser. No. 581,230
2 Claims. (Cl. 260—456)

This application is a division of co-pending application Ser. No. 378,345, filed June 26, 1964, now Patent No. 3,328,397.

This invention relates to processes for making compositions of matter classified in the art of chemistry as substituted 2-aminophenyl aryl ketones and to intermediates for making them.

The invention sought to be patented in its principal process aspect resides in the concept of converting a 2-acyloxymethyl - 4H-3,1-benzoxazin-4-one to 2-acyloxy-acetamidobenzophenone by mixing an aryl magnesium halide with the benzoxazin-4-one dispersed in a liquid medium inert to the reactants and hydrolyzing the resulting addition product.

The invention sought to be patented in a further process aspect resides in the concept of a sequence of reactions including: converting an anthranilic acid to an N-acyloxyacetylanthranilic acid by acylation with acyloxy-acetyl halide, cyclizing the product so obtained in the presence of a dehydrating agent to form a 2-acyloxy-methyl - 4H-3,1-benzoxazin-4-one, and converting said 4H - 3,1-benzoxazin-4-one to 2-acyloxyacetamidophenyl aryl ketone by addition of an aryl magnesium halide.

The invention sought to be patented in a principal composition aspect, is described as residing in the concept of a chemical compound having a molecular structure in which there is attached to the N-atom of anthranilic acid an acetoxyacetyl radical, or a phenylsulfonoxyacetal radical.

The tangible embodiments of the compositions of this aspect of the invention possess the inherent general physical properties of being high melting, white crystalline solids, are substantially insoluble in water, and are soluble in polar solvents, such as lower aliphatic alcohols. Examination of these compounds produced according to the hereinafter described process reveals upon ultraviolet and infrared spectrographic analysis, spectral data confirming the molecular structure hereinbefore set forth. Thus the

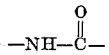

is evident. The aforementioned physical characteristics, taken together with the nature of the starting materials, and the mode of synthesis, positively confirm the structure of the compositions sought to be patented.

The invention sought to be patented in a further composition aspect, is described as residing in the concept of a chemical compound having a molecular structure in which the 4H-3,1-benzoxazin-4-one nucleus has attached, to the 2-position, the acetoxymethyl radical, or a phenyl-sulfonoxymethyl radical.

The tangible embodiments of these compositions of the invention possess the inherent general physical properties of being relatively high melting, white crystalline solids, are substantially insoluble in water and are soluble in polar solvents, such as lower aliphatic alcohols. Examination of the compounds produced according to the hereinafter described process reveals upon ultraviolet and infrared spectrographic analysis spectral data confirming the molecular structure hereinbefore set forth. Thus the internal

and —N=C— are evident. The aforementioned physical characteristics, taken together with the nature of the starting materials and mode of synthesis, positively confirm the structure of the compositions sought to be patented.

The tangible embodiments of the invention possess the inherent applied use characteristics of being intermediates for the production of valuable 2-hydroxyaminoacetamido-benzophenones, disclosed in copending U.S. applications, Ser. No. 283,966 and Ser. No. 283,967, both filed May 29, 1963, and both now abandoned, useful, for the production of 1,3 - dihydro-5-phenyl-2H-1,4-benzodiazepin-2-ones which are valuable for human and medicinal uses having demonstrated activity as anti-convulsants, sedatives, and muscle-relaxants, according to standard pharmacological test procedures.

As used herein, the term "acyl" means a radical derived from an organic acid having only one active hydrogen atom, by removal of the hydroxy group, i.e., removal of said hydrogen and the oxygenation to which it is attached, including but without limiting the generality of the foregoing, saturated and unsaturated alkanoyl such as acetyl, caproyl, aroyl such as benzoyl, naphthoyl, substituted benzoyl, araliphatic carbonyl such as cinnamoyl, heterocyclic carbonyl such as furoyl, pyridinoyl, the corresponding sulfonic acid acyl and the like.

The process of making in the manner of using the inventions will now be generally described so as to enable a person skilled in the art of chemistry to make and use the same, as follows:

The new processes of my invention and the manner of using the compositions produced thereby, are illustrated schematically for a specific embodiment thereof in FIGURE 1, to which the Roman numerals in parenthesis in the following description refer.

The starting materials for the processes of my invention are generally known or are prepared by procedures which are well known to those with ordinary skill in the art of organic chemistry.

Treatment of an anthranilic acid (I) suspended in a solvent such as chloroform or dissolved in a solvent such as dimethoxyethane with an acyloxylacetyl halide such as the chloride or bromide, produces an N-acyloxyacetyl-anthranilic acid (II) (VI). Since the reaction is exothermic, the addition is performed dropwise and its rate regulated to permit a gentle reflux of the solvent. Refluxing is continued until the liberation of hydrogen chloride or hydrogen bromide, depending on which acyloxyacetyl halide was used, is complete. The reaction is then permitted to cool and the precipitated product is separated and recrystallized.

The N-acyloxyacetylanthranilic acid so produced, is heated in admixture with an excess of the dehydrating agent such as an acid anhydride, preferably acetic anhydride, until a clear solution results. On concentration of the reaction mixture to approximately ½ its volume and cooling, the product 2-acyloxymethyl-4H-3,1-benzoxazin-4-one (III) (VII) precipitates.

When a suspension of this product is suspended in anhydrous ether and an aryl magnesium bromide, such as phenylmagnesium bromide, is added, dropwise, with stirring and chilling, I have discovered that, surprisingly, while two points are initially present for reaction, namely, an external ester and an internal ester, the reaction occurs selectively at the internal ester provided only one equivalent of the Grignard reagent is added.

Since the reaction does not occur at the external ester but occurs predominantly at the ring ester group, ring opening occurs and there is produced, a 2-acetamidobenzophenone. (IV) (VIII)

Ether is the preferred solvent for the reaction; however, any solvent in which the Grignard reagent is non-reactive can be used. The reaction mixture is stirred at room temperature for approximately 30 minutes after the addition of the Grignard reagent is complete in order to insure optimum yields. It is then decomposed with excess acid, preferably hydrochloric acid. The ether layer containing the reaction product is separated, partially concentrated under vacuum, and chilled to precipitate the product.

The 2-acyloxyacetamidobenzophenone so obtained is suspended in ethanol. Addition of sodium hydroxide or other alkali metal hydroxide solution with stirring permits hydrolysis to occur. While hydrolysis could occur either at the ester linkage or at the amide linkage, selective hydrolysis at the ester occurs to produce 2-hydroxyacetamidobenzophenone (IV). On removal of the solvent under vacuum, and recrystallization of the resulting precipitate from a solvent such as alcohol, the product is obtained in optimum yield.

The 2-hydroxyacetamidobenzophenone (V) so produced is then converted to 2-phenylsulfonoxyacetamidobenzophenone (VIII) by dissolving it in a solvent such as triethylamine and adding an arylsulfonyl halide such as for example, the chloride or the bromide. To permit reaction to go to completion, the reaction mixture is warmed on a steam bath for approximately 30 minutes. On cooling and diluting with ice water, the product precipitates out. It may be purified by recrystallization from a polar solvent such as acetonitrile.

Alternatively, anthranilic acid, suspended in a solvent such as chloroform, or dissolved in a solvent such as dimethoxyethane, can be converted to N-phenylsulfonoxyacetylanthranilic acid by the addition of a phenylsulfonoxyacetyl halide, such as the chloride or the bromide. Refluxing and stirring are continued until evolution of the hydrogen chloride or bromide, depending on the halide used, is complete.

Ring closure to the benzoxazin-4-one is carried out in a manner similar to that described above more generally for acyloxyacetylanthranilic acid.

Addition of a Grignard reagent to a 2-phenylsulfonoxymethyl-4H-3,1-benzoxazin-4-one, or in the more general situation, namely addition of a Grignard reagent to 2-acyloxymethyl-4H-3,1-benzoxazin-4-one, as described above, could occur either at the internal ester or the external ester or both producing a reaction product mixture difficult to purify. I have discovered, however that under controlled reaction conditions, particularly with respect to the amount of Grignard reagent added, reaction occurs predominantly with the internal ester, forming in good yield 2-phenylsulfonoxyacetamidobenzophenone.

The sulfonoxyacetamidobenzophenone so obtained is used for producing the valuable and useful hydroxyaminoacetamidobenzophenones (IX), by dissolving it in a solvent such as methyl cellosolve, heating it to approximately 85° C., and adding a solution of hydroxylamine hydrochloride and water containing sodium hydroxide. The temperature is maintained at approximately 85-90° C. for about 15 minutes. On cooling and dilution with water the product precipitates.

The anthranilic acids employed as starting materials for conducting our processes are known or are readily prepared by procedures known to those skilled in the art.

It will be apparent from the disclosure herein to those skilled in the art of organic chemistry that for the purposes of this invention certain of the carbon atoms of the anthranilic acids employed as starting materials can be substituted with groups which do not interfere with the subsequent reactions. Thus, the presence of groups such as halogen, alkyl, or alkoxy will not interfere under the hereinbefore described conditions and will be present unchanged in a corresponding position in the final product. It will also be apparent to those skilled in the art of organic chemistry that for the purposes of this invention certain of the carbon atoms of anthranilic acid employed as starting materials can be substituted with groups as for example hydroxy, or hydroxyalkyl which add Grignard reagent during the course of the hereinbefore reactions but remain otherwise unchanged and revert to their original identity on hydrolysis of the addition product. The presence of such groups will not interfere with the subsequent reactions provided an equivalent excess of Grignard is employed. Further it will be apparent to those skilled in the art of organic chemistry that for the purposes of this invention certain of the carbon atoms of the anthranilic acids employed as starting materials can be substituted with groups as for example an aldehyde or ketone, which groups react with Grignard reagent during the course of the hereinbefore reactions and which property can be utilized to change the said substituent under the reaction conditions to correspondingly different substituents, e.g. alcohols merely by using the appropriate equivalent excess of Grignard reagent.

From the disclosure herein, illustrating the invention as applied to aryl Grignard reagents, which produce benzophenone, it will be apparent to organic chemists that other aryl nuclei can be used in lieu of phenyl provided the Grignard reagents can be prepared, without effecting the course of the subsequent reactions. Accordingly, such reactions wherein the phenyl group is replaced by the cyclic groups which will form a Grignard reagent such as 2-thienyl are the full equivalent of the invention as particularly claimed.

When the starting compounds are substituted as hereinbefore recited, it will be apparent herefrom to those skilled in the art of chemistry, that the intermediate compounds and the final products formed by the processes of invention will bear, correspondingly, the same substituents.

It will also be apparent to those with ordinary skill in the art of organic chemistry that the acyl group except in the case where it is a sulfonyl group only serves a protecting function and therefore can be any acyl group which does not interfere with the subsequent reactions.

Similarly, the aryl group of the arylmagnesium halide used for the subsequent condensation to form the substituted aryl ketone, can be substituted with groups such as halogen, alkyl, or alkoxy which do not interfere with the further reactions involving the atom at the 2-position of the starting anthranilic acid, and these groups will be present unchanged in a corresponding position in the final product. Therefore, in the processes of the invention, except for any limitation expressed in this specification, all anthranilic acids containing non-interfering groups can be employed as starting materials in the process of making aspect of this invention. In like manner, in the 2-acetoxyacetamidoanthranilic acids or the 2-phenylsulfonoxyacetamido anthranilic acids of my invention, the aryl ring can be substituted. The acyloxyacetamidobenzophenones and the hydroxyacetamidobenzophenones, formed as intermediates, can be substituted at the acetamido nitrogen with hydrogen, or the hydrogen may be replaced subsequent to the formation of the aryl ketone, with an alkyl group such as methyl, ethyl, isopropyl, alkenyl group such as allyl and methallyl or a lower aralkyl group such as benzyl or phenethyl.

The phenyl group of the anthranilic acid and the aryl group later introduced, referred to above, can have substituents other than hydrogen, as for example, but without limitation, lower alkyl, chlorine, bromine, trifluoromethyl, or methylsulfonyl; such substituents do not interfere with the course of the reactions here involved.

The following examples illustrate the best mode contemplated by the inventor of using the claimed processes of the invention and of the manner of making and using specific embodiments of the claimed compositions of the invention.

Example 1

To a suspension of 17.1 g. of 5-chloroanthranilic acid in 250 ml. of chloroform, add with stirring, a solution of 20 g. of acetoxyacetylchloride in 50 ml. of chloroform. Heat the reaction mixture as necessary to maintain reflux, continuing the refluxing until the evolution of hydrogen chloride gas is complete, i.e, about 1 and ½ hours. Allow to cool to precipitate 5-chloro-N-acetoxyacetylanthranilic acid (25 g.). On recrystallization from an alcohol-water mixture, the product has a M.P. 204–207° C.

*Analysis.*—Calculated for: $C_{11}H_{10}ClNO_5$: C, 48.62; H, 3.71; N, 5.16; Cl, 13.05%. Found: C, 48.94; H, 3.63; N, 5.38; Cl, 13.3%.

Prepare 5 - chloro-N-p-tolylsulfonoxyacetylanthranilic acid, M.P. 204–206° C., from 7.0 g. of 5-chloroanthranilic acid and 12 g. of p-toluenesulfonoxyacetyl chloride according to the procedure described above.

*Analysis.*—Calculated for: $C_{16}H_{14}ClNO_6S$: C, 50.07; H, 3.68; N, 3.65; Cl, 9.24; S, 8.35%. Found: C, 50.21; H, 3.75; N, 3.61; Cl, 9.5; S, 8.50%.

Prepare 5 - chloro-N-phenylsulfonoxyacetylanthranilic acid, M.P 183–185° C., from 13 g. 5-chloroanthranilic acid and 18 g. of phenylsulfonoxyacetyl chloride according to the procedure described above (dimethoxyethane as solvent)

*Analysis.*—Calculated for: $C_{15}H_{12}ClNO_6S$: C, 48.72; H, 3.27; N, 3.75; Cl, 9.59; S, 8.67%. Found: C, 48.61; H, 3.13; N, 3.73; Cl, 9.7; S, 8.6%.

Example 2

Heat a mixture of 13.5 g. of 5-chloro-N-acetoxyacetylanthranilic acid and 130 ml. of acetic anhydride on a steam bath for approximately 30 minutes at which time a clear solution will have resulted. Concentrate the reaction mixture to ½ its volume, cool to obtain 5.5 g. of white solid 6-chloro-2-acetoxymethyl-4H-3,1-benzoxazin-4-one, M.P. 122–124° C. Further concentration of the filtrate resulting from separation of solid product, gives an additional 7.0 g., approximately.

*Analysis.*—Calculated for: $C_{11}H_8ClNO_4$: C, 52.09; H, 3.18; N, 5.52; Cl, 13.98%. Found: C, 52.30; H, 3.09; N, 5.62; Cl, 13.82%.

Example 3

To a suspension of 2.5 g. (0.01 mol) of 6-chloro-2-acetoxymethyl-4H-3,1-benzoxazin-4-one in 25 ml. of anhydrous ether, add dropwise with stirring and chilling 15 ml. of ether containing 0.012–0.013 mol of phenylmagnesium bromide. Stir the reaction mixture at room temperature for about ½ hour, then decompose the Grignard addition product and any excess Grignard reagent with excess 2N hydrochloric acid. Separate the ether layer, partialy concentrate, and chill to precipitate 2-acetoxy-acetamido-5-chlorobenzophenone (1.4 g., M.P. 121–123° C.).

Example 4

To a suspension of 66.6 g. of 2-acetoxyacetamido-5-chlorobenzophenone in 550 ml. of ethanol, add with stirring a solution of 8 g. of sodium hydroxide in 60 ml. of water. Continue the stirring until all the reactants are dissolved and the solution is clear.

Add approximately 750 ml. of water to precipitate 2-hydroxyacetamido-5-chlorobenzophenone. To purify, recrystallize from ethanol (55 g., 94% yield, M.P. 150–152° C.).

*Analysis.*—Calculated for: $C_{15}H_{12}ClNO_3$: C, 62.18; H, 4.18; N, 4.84; Cl, 12.24%. Found: C, 62.29; H, 4.12; N, 4.72; Cl, 12.30%.

Example 5

Prepare 6 - chloro - 2 - p-tolylsulfonoxymethyl-4H-3,1-benzoxazin-4-one, M.P. 140–142° C., from 5-chloro-N-p-tolylsulfonoxyacetylanthranilic acid and 70 ml. of hot acetic anhydride by the procedure described in Example 2.

Example 6

Prepare 2 - p - tolylsulfonoxyacetamido-5-chlorobenzophenone from 3 g. of 6-chloro-2-p-tolylsulfonoxymethyl-4H-3,1-benzoxazin-4-one and 0.0065 mole of phenyl magnesium bromide by the procedure of Example 3.

Prepare 2 - p - tolylsulfonoxyacetamido - 5-chloro-2′-chlorobenzophenone from 6 - chloro - 2 - tolylsulfonoxymethyl-4H-3,1-benzoxazin-4-one and o-chlorophenyl magnesium bromide by the procedure of Example 3.

Example 7

To the solution of 5.1 g. of 2-p-bromophenylsulfonoxyacetamido-5-chlorobenzophenone in 15 ml. methylcellosolve, heated to 85° C., add a solution of 10 g. of hydroxylamine hydrochloride and 5 g. of sodium hydroxide in 20 ml. of water. Maintain the temperature at 95–90° C., for 15 minutes. Cool and dilute with water. Separate the precipitated product and recrystallize from benzene. There is obtained 2-hydroxyaminocetamido-5-chlorobenzophenone, M.P. 129–131° C.

Prepare 2 - hydroxyaminoacetamido - 5 - chlorobenzophenone from 2 - p - tolylsulfonoxyacetamido-5-chlorobenzophenone by the procedure described above.

The subject matter which the applicant regards as his invention is particularly pointed out and distinctly claimed as follows:

1. 5-chloro-N-phenylsulfonoxyacetylanthranilic acid.
2. 5-chloro-N-p-tolylsulfonoxyacetylanthranilic acid.

References Cited
UNITED STATES PATENTS 3,313,805   4/1967   Bell _____ 260—456

CHARLES B. PARKER, *Primary Examiner.*

L. C. MARUZO, *Assistant Examiner.*